T. W. FRECH, Jr.
SEAL FOR SECTIONAL LEADING IN WIRES.
APPLICATION FILED JAN. 10, 1907. RENEWED SEPT. 8, 1911.
1,006,198.
Patented Oct. 17, 1911.
2 SHEETS—SHEET 1.
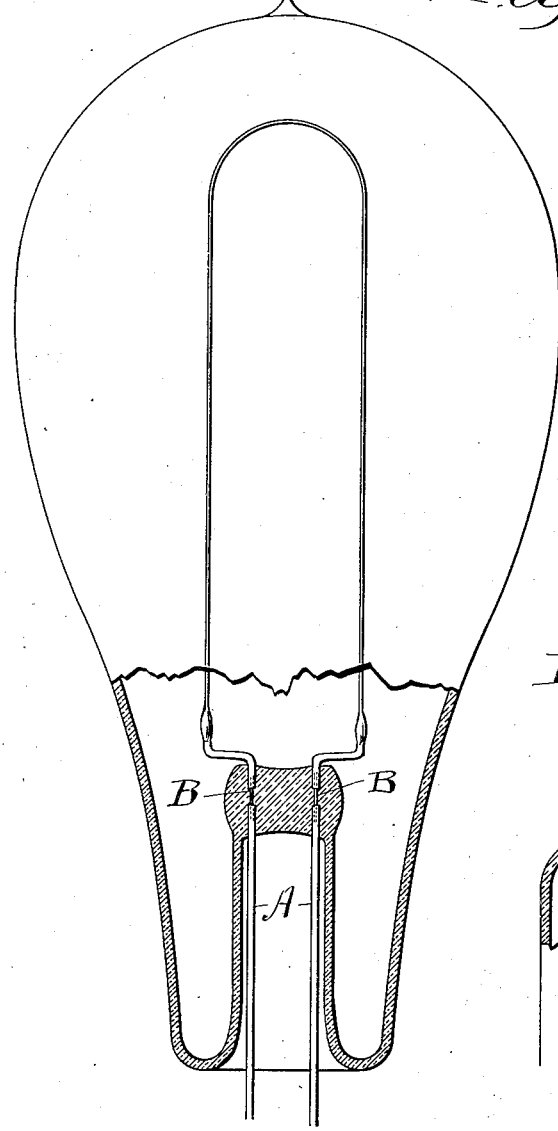

T. W. FRECH, Jr.
SEAL FOR SECTIONAL LEADING IN WIRES.
APPLICATION FILED JAN. 10, 1907. RENEWED SEPT. 8, 1911.
1,006,198.
Patented Oct. 17, 1911.
2 SHEETS—SHEET 2.
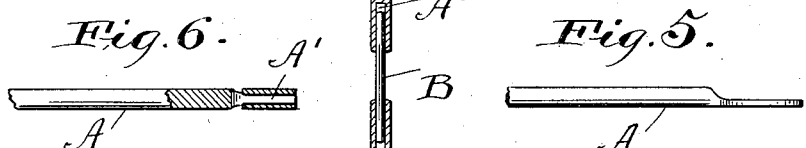
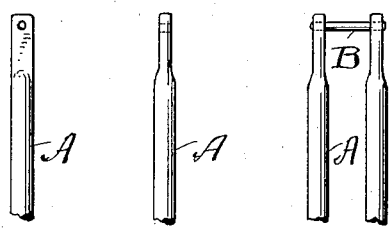
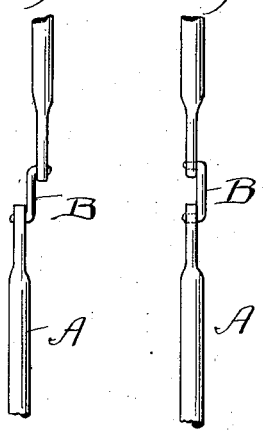
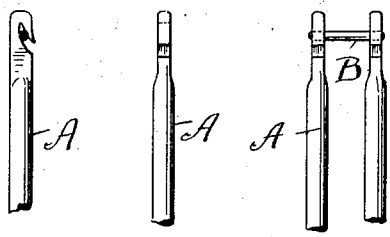
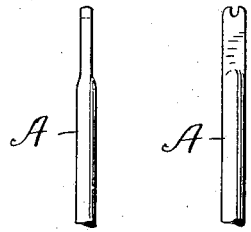
Witnesses
E. B. Gilchrist
H. R. Sullivan
Inventor
Theodore W. Frech, Jr.
by
Thurston Woodward

UNITED STATES PATENT OFFICE.

THEODORE W. FRECH, JR., OF CLEVELAND, OHIO.

SEAL FOR SECTIONAL LEADING-IN WIRES.

1,006,198.  Specification of Letters Patent.  Patented Oct. 17, 1911.

Application filed January 10, 1907, Serial No. 351,679. Renewed September 8, 1911. Serial No. 648,404.

*To all whom it may concern:*

Be it known that I, THEODORE W. FRECH, Jr., a citizen of the United States, residing at Cleveland, in the county of Cuyahoga and State of Ohio, have invented a certain new and useful Improvement in Seals for Sectional Leading-In Wires, of which the following is a full, clear, and exact description.
The object of the present invention is to produce an improved form of sectional leading-in wire for incandescent lamps in which the sections shall have joints of such diameter as will permit of the wire being securely embedded in the stem without endangering the effectiveness of the seal.

In the manufacture of the stem in which the leading-in wires are embedded, the thickness of the glass stem is determined by the fixed distance between the squeezing jaws. If there are projections, spurs, or enlarged beads at the joints in the sectional leading-in wires caused by the deflected platinum ends or the uneven flow of fused copper, the glass coating or covering will necessarily be substantially thinner over the joints than over the copper section itself. The enlarged joints being coated or covered at points by a thin skin of glass, materially thinner than the covering of the body of the copper wire behind the joint, which latter is determined by the gaged distance between the squeezing jaws of the machine employed in forming the seal, thus come so close to the surface of the glass as to endanger the integrity of the seal.

It is the purpose of my invention to provide electric lamps and other articles, in which sectional leading-in wires may be advantageously employed, with a seal in which the glass covering over the joints is of substantially the same thickness as the covering over the larger conducting wire, for which latter the jaws of the machine are gaged.
Referring to the accompanying drawings which illustrate certain specifically different embodiments of my invention, Figure 1 is a view of a lamp bulb, partly in section, showing the leading-in wire jointed according to one form of my novel construction. Fig. 1ª is a detail section of the stem, at right angles to Fig. 1. Fig. 2 illustrates one form of wire end, of copper, or equivalent material, used in forming a joint with the platinum. Fig. 3 is a view, partly in section, showing the section of platinum, or equivalent, wire inserted in the ends of the copper sections of the leading-in wire. Fig. 4 is a perspective view showing the shape into which the end of the copper wire is made before the joint, such as shown in Figs. 2 and 3, is formed. Fig. 5 is a side view of the same. Fig. 6 is a horizontal section through the end of the wire shown in Fig. 2. Fig. 7 is a modified form in which the socket is not so nearly closed as in Fig. 2. Figs. 8 and 9 are side views, at right angles to each other, of a modification in which the end of the copper wire is perforated laterally, or transversely, to receive the platinum section. Fig. 10 is a view of two copper sections, such as shown in Fig. 9, with the platinum section placed in position for permanent attachment. Figs. 11 and 12 are side elevations illustrating two possible methods of straightening out the conductor sections shown in Fig. 10, after the platinum is permanently attached. Figs. 13 and 14 are side elevations, at right angles to each other, of modified forms of the copper wire in which an opening in the form of a lateral incision has been made to receive the platinum section. Fig. 15 is a side elevation showing two of the copper conductors, of the form shown in Fig. 14, with the platinum section in place. Figs. 16 and 17 are side elevations of still another modification somewhat similar to that shown in Figs. 8 and 9 but having, instead of a lateral perforation, a notch, in the end in which the platinum section is placed.

In the various forms of joint shown the copper wire A is reduced in cross sectional mass at the joint, where the platinum wire B is secured to the copper. In the form shown in Fig. 2, and also in the form shown in Fig. 7, a longitudinal socket is provided in the end of the wire A, by the simple expedient of flattening the end of the conductor wire, as shown in Figs. 4 and 5, and drawing the same through a suitably shaped die, of a diameter not materially greater than the wire itself, to curl it into the form shown in Fig. 2, or as shown in Fig. 7. The mass of the copper is thus stretched out in length and decreased in cross section. When the platinum section B is placed in the socket, A' thus produced, and the fusing flame is applied to the end of the copper about the edge of the socket, the thin edge fuses readily and adheres to the platinum making a satisfactory joint, but there is no enlarged knot or joint, or projecting spur.

In the several forms shown in Figs. 8 to 17, the cross sectional mass of the copper wire is reduced at the zone of formation of the joint, in each instance, and these figures show mere modifications of sockets or pockets which I find it convenient to use in attaching the platinum to the copper wire. In all of these forms, owing to the fact that the necessary mass to be fused is reduced, fusion occurs readily and the joint is quickly formed, and there does not come into existence any enlarged bead of copper, or copper-platinum alloy, of greater diameter than the conductor wire itself. Even should the fused copper flow slightly, there could be no form of an enlarged bead since at such point the cross sectional mass of the wire is reduced and the fused metal, while perhaps slightly thickening the reduced section of the copper wire, does not create a bead materially greater than the copper wire itself. In all of these forms it is to be noted that the common characteristic is that the end of the copper wire is reduced, preliminarily to fusion, so that the bead or the spurs, formed by the fusion will be of substantially no greater diameter than the body of the wire itself and the coating of glass thereover will be of substantially the same thickness as over the body of the copper wire, for which latter the thickness of the glass stem is sufficient.

In the formation of the seal these sectional leading-in wires are placed in the stem so that when the end of the stem is fused and pinched together the joints will be embedded in the fused glass; and the wire as a whole will of course be caught in between the end walls of the stem end, and the end will be pinched and pressed to that thickness to which the machine is adjusted. With the forms of joints of leading-in wire which I have shown the glass will have substantially the same thickness over the joints of the sections as over the larger or copper wire itself. This thickness is sufficient for the purpose of an efficient seal, and there will be no danger of the glass coating being cracked by reason of undue expansion, in any direction, of the joint.

Having thus described my invention, I claim:

1. A seal for an electric lamp comprising a leading-in wire composed of sections of dissimilar metal joined together to form efficient electrical connection, the joints between said sections having the same diameter or cross-sectional area as that of the largest component section, and a sealing material inclosing said sectional leading-in wire.

2. A seal for an electric lamp comprising a sectional leading-in wire embedded in a vitreous sealing material, one of the sections being of a material whose coefficient of expansion is substantially the same as that of glass, and said sections being joined together to form an efficient electrical connection, the joints between said sections having a cross-sectional area within that of the largest component section, whereby the sealing material over the joint will be of substantially the same thickness as over the largest component section.

3. An incandescent lamp having the leading-in-wire composed of portions of dissimilar metals having different cross-sections, the joint of which is of substantially of the same thickness as the larger of said portions.

In testimony whereof, I hereunto affix my signature in the presence of two witnesses.

T. W. FRECH, Jr.

Witnesses:
A. H. WALL,
ALMA THOMAS.